(12) United States Patent
Lovins-Wilusz et al.

(10) Patent No.: US 11,970,063 B2
(45) Date of Patent: Apr. 30, 2024

(54) LASH ANGLE DETERMINATION (71) Applicant: GM Global Technology Operations LLC, Detroit, MI (US)

(72) Inventors: Noah Jon Lovins-Wilusz, Royal Oak, MI (US); Robert L. Morris, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 438 days.

(21) Appl. No.: 17/398,463

(22) Filed: Aug. 10, 2021

(65) Prior Publication Data

US 2023/0051472 A1 Feb. 16, 2023

(51) Int. Cl.
*B60L 15/20* (2006.01)
*B60L 3/12* (2006.01)
*G05B 19/042* (2006.01)
*G06F 17/18* (2006.01)

(52) U.S. Cl.
CPC ............... *B60L 15/20* (2013.01); *B60L 3/12* (2013.01); *G05B 19/042* (2013.01); *G06F 17/18* (2013.01)

(58) Field of Classification Search
None
See application file for complete search history.

(56) References Cited

U.S. PATENT DOCUMENTS

| 2007/0012130 | A1* | 1/2007 | Chevalier | F16H 57/12 74/409 |
| 2010/0185379 | A1* | 7/2010 | Burkhardt | F02D 41/18 701/103 |
| 2012/0101705 | A1* | 4/2012 | Templin | B60W 30/20 701/99 |
| 2016/0377171 | A1* | 12/2016 | Ryu | F16H 55/18 74/409 |

FOREIGN PATENT DOCUMENTS

JP 2015048750 A * 3/2015

* cited by examiner

*Primary Examiner* — Justin S Lee
(74) *Attorney, Agent, or Firm* — CANTOR COLBURN LLP (57) ABSTRACT

Examples described herein provide a computer-implemented method that includes calculating, by a processing device, a motor acceleration error based at least in part on a motor torque and a motor speed. The method further includes calculating, by the processing device, a regression fit line based at least in part on the motor acceleration error. The method further includes identifying, by the processing device, a zero point using the regression fit line. The method further includes comparing, by the processing device, the zero point to a datum reference to determine a difference. The method further includes integrating, by the processing device, the difference to determine the lash angle. The method further includes controlling, by the processing device, the motor based at least in part on the lash angle.

20 Claims, 11 Drawing Sheets

LASH ANGLE DETERMINATION

INTRODUCTION

The present disclosure relates to detecting a lash angle for a motor.

Modern vehicles (e.g., a car, a motorcycle, a boat, or any other type of automobile) may be equipped with one or more electric motors, such as to drive a wheel(s) of the vehicle. For example, an electric motor can be mechanically coupled to a wheel of a vehicle to apply rotational force to the wheel, creating a driveline. In this example, the coupling between the electric motor and the wheel includes gears/splines. Due to manufacturing tolerances, the gears/splines within the driveline may have gaps or play. When transitions occur (e.g., a change in direction, speed, torque, etc., of the electric motor), the gaps or play in the gears/splines can cause backlash (or "lash") within the driveline to occur. Particularly, lash is a clearance or lost motion in a mechanism caused by gaps between parts, such as two gears. Lash can cause poor drive quality for the vehicle.

SUMMARY

In one exemplary embodiment, a computer-implemented method for lash angle determination is provided. The method includes calculating, by a processing device, a motor acceleration error based at least in part on a motor torque and a motor speed. The method further includes calculating, by the processing device, a regression fit line based at least in part on the motor acceleration error. The method further includes identifying, by the processing device, a zero point using the regression fit line. The method further includes comparing, by the processing device, the zero point to a datum reference to determine a difference. The method further includes integrating, by the processing device, the difference to determine the lash angle. The method further includes controlling, by the processing device, the motor based at least in part on the lash angle.

In addition to one or more of the features described herein, or as an alternative, further embodiments of the method may include that the motor is disposed in a vehicle.

In addition to one or more of the features described herein, or as an alternative, further embodiments of the method may include that calculating the motor acceleration error includes calculating the motor acceleration error "n" number of times, and that calculating the regression fit line includes vectorizing the motor acceleration error for the "n" number of times.

In addition to one or more of the features described herein, or as an alternative, further embodiments of the method may include that the regression fit line is calculated using a linear least squares regression.

In addition to one or more of the features described herein, or as an alternative, further embodiments of the method may include that calculating the regression fit line includes calculating a slope and an intercept.

In addition to one or more of the features described herein, or as an alternative, further embodiments of the method may include that identifying the zero point includes dividing a negated value of the intercept by the slope.

In addition to one or more of the features described herein, or as an alternative, further embodiments of the method may include that controlling the motor based at least in part on the lash angle includes controlling a torque of the motor of the vehicle based at least in part on the lash angle.

In another exemplary embodiment a system includes a memory having computer readable instructions. The system further includes a processing device for executing the computer readable instructions, the computer readable instructions controlling the processing device to perform operations for determining a lash angle of a motor. The operations include calculating, by the processing device, a motor acceleration error based at least in part on a motor torque and a motor speed. The operations further include calculating, by the processing device, a regression fit line based at least in part on the motor acceleration error. The operations further include identifying, by the processing device, a zero point using the regression fit line. The operations further include comparing, by the processing device, the zero point to a datum reference to determine a difference. The operations further include integrating, by the processing device, the difference to determine the lash angle. The operations further include controlling, by the processing device, the motor based at least in part on the lash angle.

In addition to one or more of the features described herein, or as an alternative, further embodiments of the system may include that the motor is disposed in a vehicle.

In addition to one or more of the features described herein, or as an alternative, further embodiments of the system may include that calculating the motor acceleration error includes calculating the motor acceleration error "n" number of times, and that calculating the regression fit line includes vectorizing the motor acceleration error for the "n" number of times.

In addition to one or more of the features described herein, or as an alternative, further embodiments of the system may include that the regression fit line is calculated using a linear least squares regression.

In addition to one or more of the features described herein, or as an alternative, further embodiments of the system may include that calculating the regression fit line includes calculating a slope and an intercept.

In addition to one or more of the features described herein, or as an alternative, further embodiments of the system may include that identifying the zero point includes dividing a negated value of the intercept by the slope.

In addition to one or more of the features described herein, or as an alternative, further embodiments of the system may include that controlling the motor based at least in part on the lash angle includes controlling a torque of the motor of the vehicle based at least in part on the lash angle.

In yet another exemplary embodiment a computer program product includes a computer readable storage medium having program instructions embodied therewith, wherein the computer readable storage medium is not a transitory signal per se, the program instructions executable by a processing device to cause the processing device to perform operations for lash angle determination. The operations include calculating, by the processing device, a motor acceleration error based at least in part on a motor torque and a motor speed. The operations further include calculating, by the processing device, a regression fit line based at least in part on the motor acceleration error. The operations further include identifying, by the processing device, a zero point using the regression fit line. The operations further include comparing, by the processing device, the zero point to a datum reference to determine a difference. The operations further include integrating, by the processing device, the difference to determine the lash angle. The operations further include controlling, by the processing device, the motor based at least in part on the lash angle.

In addition to one or more of the features described herein, or as an alternative, further embodiments of the computer program product may include that the motor is disposed in a vehicle.

In addition to one or more of the features described herein, or as an alternative, further embodiments of the computer program product may include that calculating the motor acceleration error includes calculating the motor acceleration error "n" number of times, and that calculating the regression fit line includes vectorizing the motor acceleration error for the "n" number of times.

In addition to one or more of the features described herein, or as an alternative, further embodiments of the computer program product may include that the regression fit line is calculated using a linear least squares regression.

In addition to one or more of the features described herein, or as an alternative, further embodiments of the computer program product may include that calculating the regression fit line includes calculating a slope and an intercept, and that identifying the zero point includes dividing a negated value of the intercept by the slope.

In addition to one or more of the features described herein, or as an alternative, further embodiments of the computer program product may include that controlling the motor based at least in part on the lash angle includes controlling a torque of the motor of the vehicle based at least in part on the lash angle.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for lash angle determination. Driveline lash is a result of transitions (e.g., a change in direction, speed, torque, etc.) of a motor and can cause poor drive quality for a vehicle having the motor. Conventional techniques for reducing the effects of lash include predicting a lash angle and programmatically accounting for the lash angle. Lash angle is the amount of rotation that occurs during a transition when any part of a mechanical system is moved without applying force or motion to the next part in the system. In a vehicle, the lash angle can change over time. As a result, reduced drive quality over the life of the vehicle can occur due to an incorrect lash angle estimation and/or changing of the lash angle over time. Further, gear wear and manufacturing variances affect lash transition performance from vehicle to vehicle. For example, two similar vehicles may have different lash angles due to gear wear, driving style, manufacturing variances, etc.

The present techniques address these and other shortcomings of the prior art by algorithmically detecting a lash endpoint of driveline lash using motor acceleration while avoiding false-positives due to noise. Taking a discrete derivative of motor speed is useful to find actual motor acceleration; however, this calculation is volatile and prevents using low values as thresholds for detecting lash exit using motor acceleration error without false-triggers creating disturbance. In examples, linear regression is used to detect the end of the driveline lash. The present techniques further provide for comparing the detected lash endpoint against datum and creating a closed loop feedback that can learn the physical lash angle for the driveline of the vehicle in real-time.

According to one or more embodiments described herein, the underlying physics can be used to determine the lash exit by taking advantage of the trend in motor acceleration (see, e.g., FIG. 3B) and applying linear regression to find a zero point (e.g., an end of lash time) without risking inaccurate false-triggers. After the motor acceleration triggers the linear regression, a number (e.g., a predefined number) of data points relative to that trigger are saved and used to calculate the coefficients of the first order curve representing the data points relative to the trigger. These coefficients are used to calculate the time value where the lash exits (e.g., where the motor acceleration error crosses zero). This value is added to the trigger lash exit detection and integrated over time through each lash transition. The result of the integration then multiplies the lash angle estimate, creating a feedback control loop for the lash state and lash angle estimate.

Figure 1:
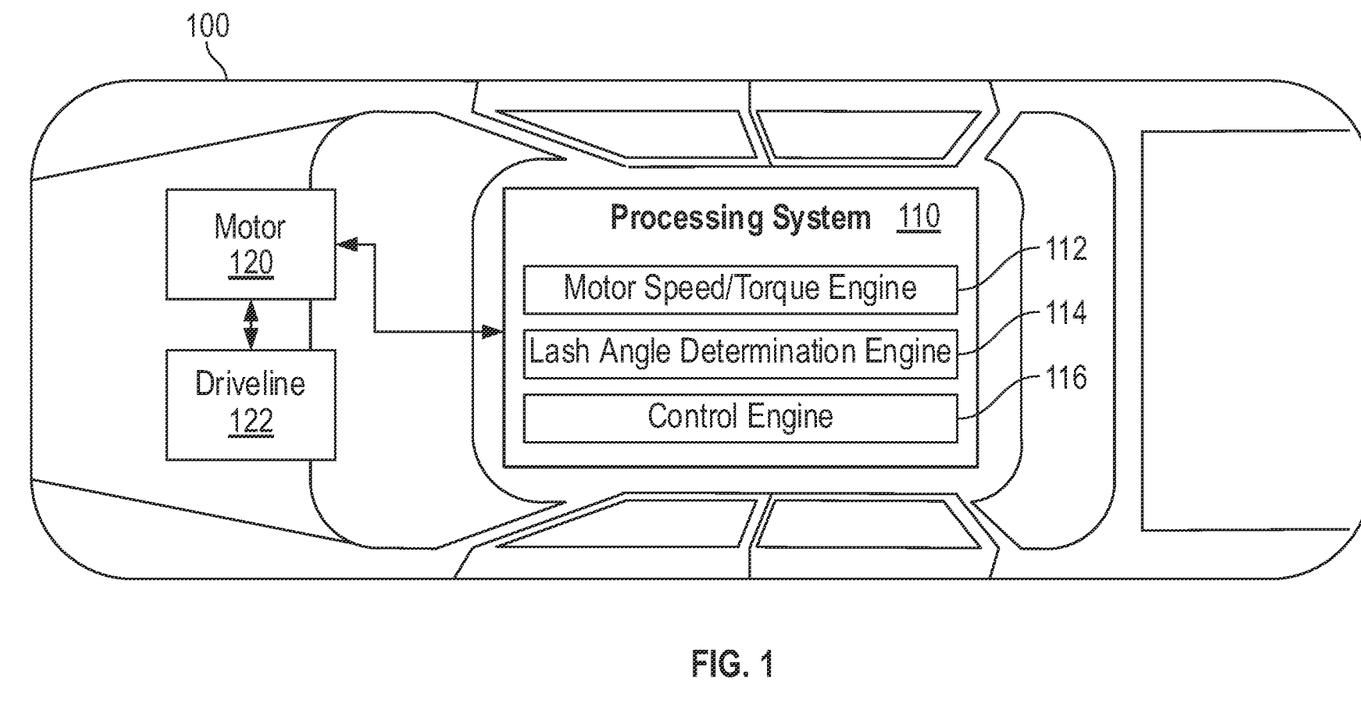
FIG. 1 depicts a vehicle including a processing system for lash angle determination according to one or more embodiments described herein.

FIG. 1 depicts a vehicle 100 including a processing system 110 for lash angle determination according to one or more embodiments described herein. In the example of FIG. 1, the vehicle 100 includes the processing system 110 and an electric motor 120 coupled to a driveline 122. The vehicle 100 may be a car, truck, van, bus, motorcycle, boat, plane, or another suitable vehicle.

The processing system 110 includes a motor speed/torque engine 112, a lash angle determination engine 114, and a control engine 116. Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like.

According to one or more embodiments described herein, the various components, modules, engines, etc. described regarding the processing system 110 of FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the processors 1021 of FIG. 10) for executing those instructions. Thus a system memory (e.g., the RAM 1024 of FIG. 10) can store program instructions that when executed by the processing device implement the engines described herein. Other engines can also be utilized to include other features and functionality described in other examples herein. The features and functionality of the engines of the processing system 110 are described further herein.

The processing system 110 of the vehicle 100, using the motor speed/torque engine 112 monitors aspects of the motor 120, including, for example, motor speed and torque. The processing system 110 uses the information about the motor 120 to perform, using the lash angle determination engine 114, lash angle determination for the driveline 122 of the vehicle 100. Further, the processing system 110, using the control engine 116, can control the motor 120 to reduce the undesirable effects of lash.

According to one or more embodiments described herein, the lash angle determination engine 114 calculates a motor acceleration using the derivative of motor speed and the commanded motor torque divided by motor inertia, as received from the motor speed/torque engine 112. The lash angle determination engine 114 then takes a difference of the two and when the value of the difference moves away from zero, it signifies the end of the driveline-lash transition. When the difference crosses a calibration threshold value, a linear regression can be performed on logged data points before and after the threshold value to determine at what time value the motor acceleration difference crossed the zero point. The zero point is determined, for example, using regression techniques and is then logged and compared to a datum reference of the lash exit point. That difference is then integrated and multiplied into the datum lash angle estimate, creating a feedback loop to learn the true physical lash angle. This process is described further with reference to the following figures.

Figure 2:
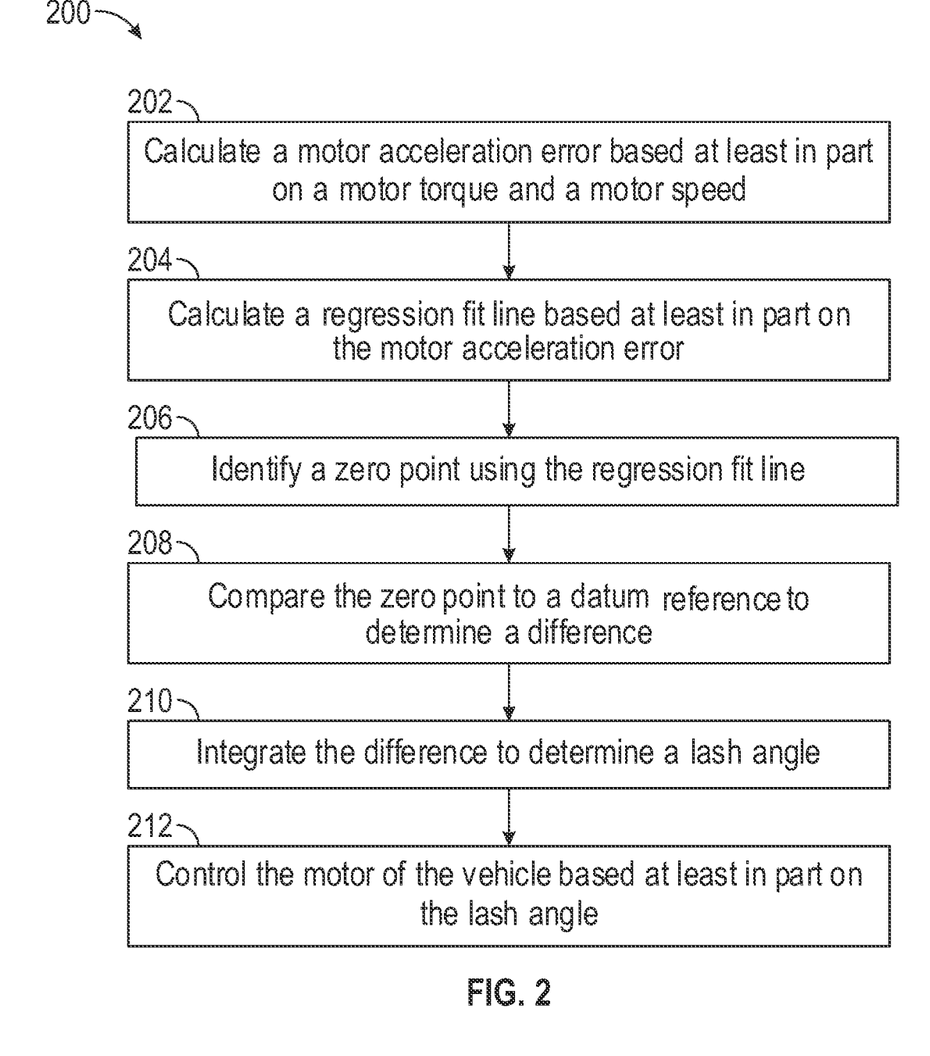
FIG. 2 depicts a flow diagram of a method for lash angle determination according to one or more embodiments described herein.

In particular, FIG. 2 depicts a flow diagram of a method 200 for lash angle determination according to one or more embodiments described herein. The method 200 can be performed by any suitable system or device such as the processing system 110 of FIG. 1, the processing system 1000 of FIG. 10, or any other suitable processing system and/or processing device (e.g., a processor).

Figure 3A:
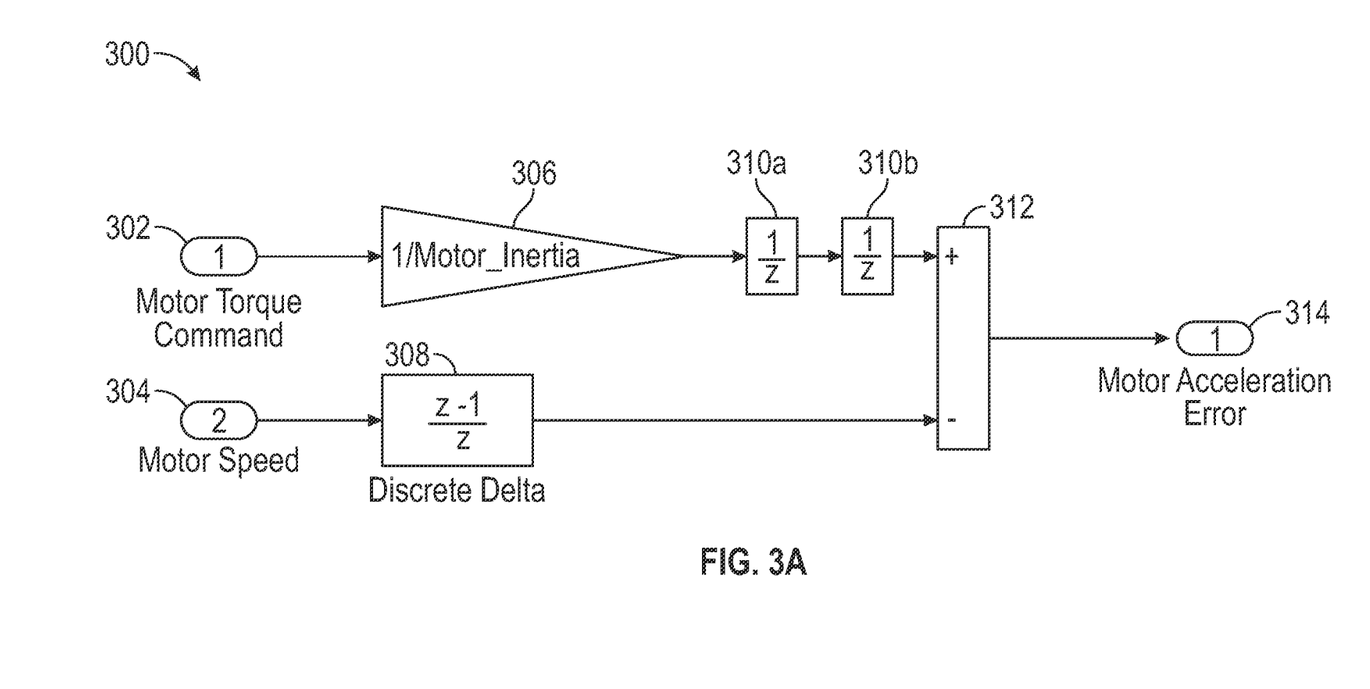
FIG. 3A depicts a block diagram of a system for calculating motor acceleration error according to one or more embodiments described herein.

At block 202, the lash angle determination engine 114 calculates a motor acceleration error based at least in part on a motor speed and a motor torque. The motor speed/torque engine 112 receives the motor speed and a motor torque from the motor 120 directly or indirectly (such as from a device (not shown) associated with the motor 120). The motor speed indicates how fast the motor is turning, and the motor torque indicates how much torque is being applied by the motor. FIG. 3A is now described, which depicts a block diagram of a system 300 for calculating motor acceleration error according to one or more embodiments described herein. As shown, a motor torque command 302 and motor speed 304 are received (such as from the motor speed/torque engine 112 that monitors the motor 120) and are fed into an inertia block 306 and a discrete delta block 308 respectively. The inertia block 306 determines a commanded acceleration based on motor inertia only as the inverse of motor inertia. The output of the inertia block 306 is aligned at blocks 310a, 310b, and the output is input into an error calculation block 312. The discrete delta block 308 determines a calculated acceleration as a time-derivative of motor speed using the motor speed as shown, and the output of the discrete delta block 308 is also input into the error calculation block 312. The error calculation block 312 determines the motor acceleration error (or difference) 314. For example, since inertia is used in the motor 120 only, when the acceleration error (or difference) is near zero, the motor 120 is experiencing lash.

Figure 3B:
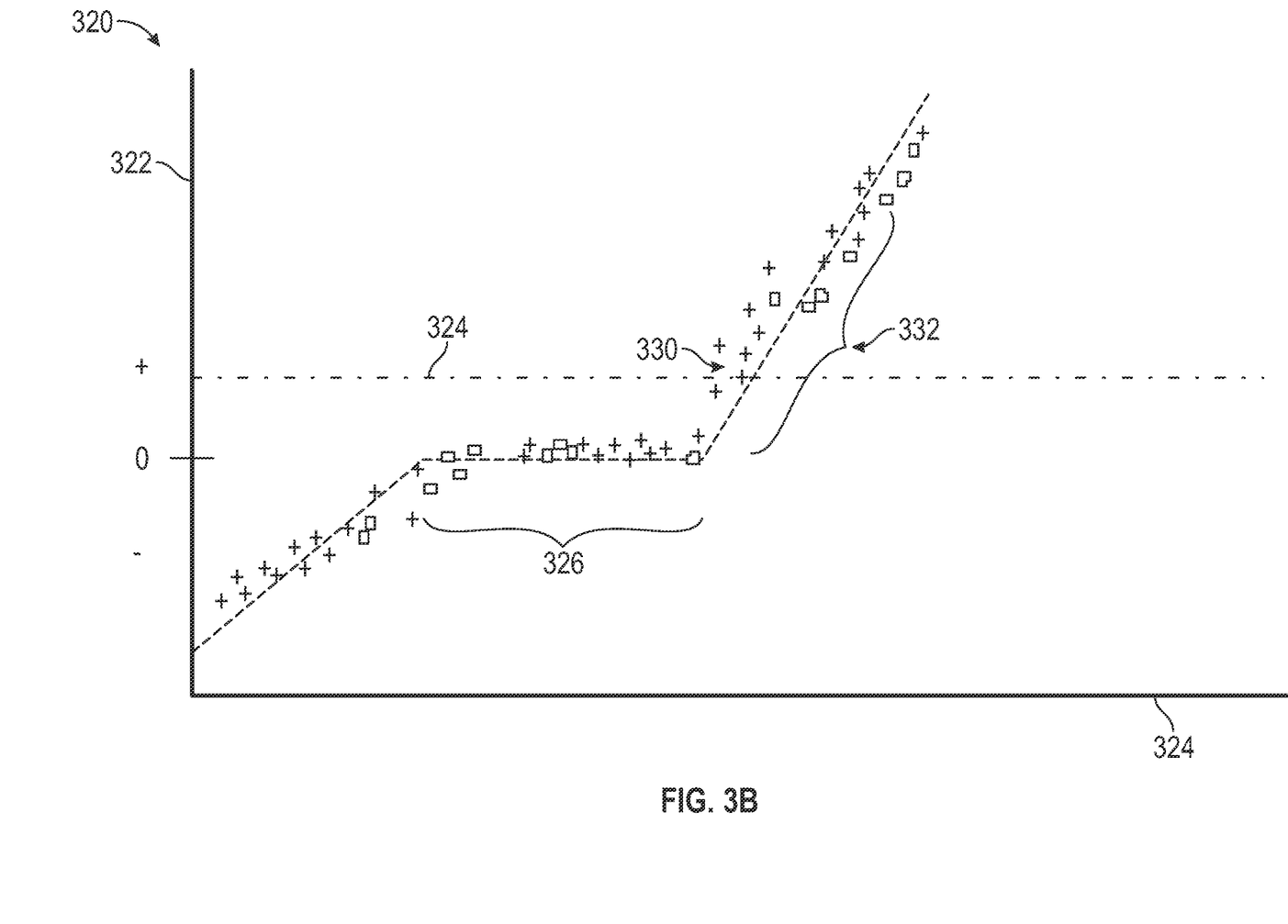
FIG. 3B depicts a graph of motor acceleration error over time according to one or more embodiments described herein.

FIG. 3B depicts a graph 320 of a positive lash transition plotted as motor acceleration error 322 over time 324 according to one or more embodiments described herein. In the graph 320, a lash zone 326 is shown. These data points represent the motor acceleration error 322 while the lash is occurring. Where the motor acceleration error 322 crosses a threshold 328 (e.g., at the point 330), the method 200 of FIG. 2 is triggered. That is, a lash adaption technique is triggered. The points 332 before and after the point 330 (e.g., the trigger point) are used to fit a linear regression curve/line (see, e.g., FIG. 4).

Figure 4:
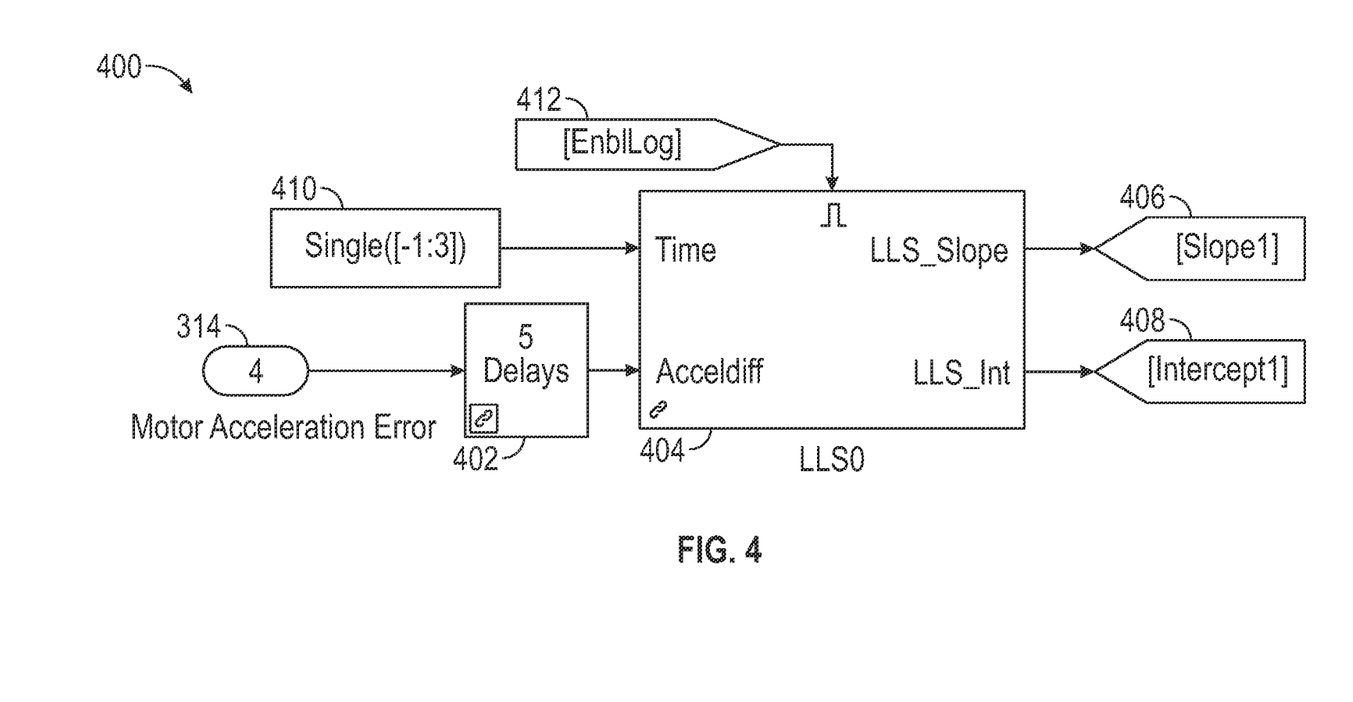
FIG. 4 depicts a block diagram of a system for calculating a regression fit line according to one or more embodiments described herein.

Returning to the discussion of FIG. 2, at block 204, the lash angle determination engine 114 calculates a regression fit line based at least in part on the motor acceleration error calculated at block 202. FIG. 4 is now described, which depicts a block diagram of a system 400 for calculating a regression fit line according to one or more embodiments described herein. The system 400 receives the motor acceleration error (or difference) 314, which is input into a delay block 402. The delay block 402 vectorizes the last "n" (e.g., 5, 3, 7, 4, 11, etc.) data points of the motor acceleration error, and inputs the vectorized value into a regression calculation block 404 (also referred to as a "linear least squares (LLS)). The regression calculation block 404 performs a regression analysis (e.g., a linear least squares regression) to approximate regression coefficients (e.g., a slope 406 and an intercept 408) that together define a regression fit line. The regression calculation block 404 can also utilize a time value 410 (i.e., single ([4:3]) and an Enbl Log value 412. According to one or more embodiments described herein, the regression calculation block 404 can be an embedded controller (e.g., a digital signal processor, a microprocessor, a field-programmable gate array, etc.). It should be appreciated that, by using the regression based approach of FIG. 4, false-triggers caused by motor noise are reduced and/or eliminated because regression is used to generate the lash angle.

Figure 5:
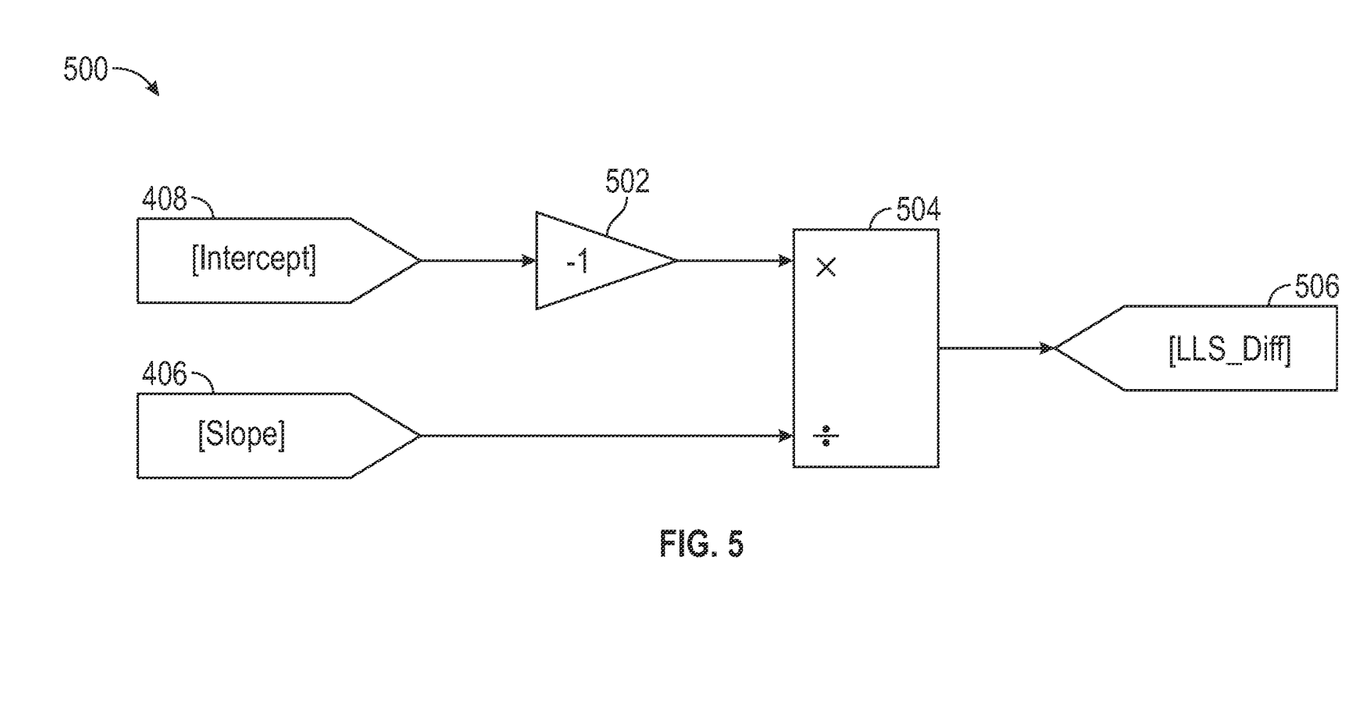
FIG. 5 depicts a block diagram of a system for solving the regression fit line to determine a time of lash exit according to one or more embodiments described herein.

Returning to the discussion of FIG. 2, at block 206, the lash angle determination engine 114 identifies a zero point using the regression fit line calculated at block 204. FIG. 5 is now described, which depicts a block diagram of a system 500 for solving the regression fit line to determine a time of lash exit according to one or more embodiments described herein. The system 500 takes as input the slope 406 and the intercept 408. The intercept 408 is negated at block 502, and at block 504, the negated value of the intercept 408 and the slope 406 are used to solve for the time of lash exit 506 (i.e., the time at which the lash ends). For example, using the equation y=mx+b, where m is the slope 406 and b is the intercept 408, the equation can be solved to find the time of lash exit 506 (e.g., for y=0, x=−b/m). That is, the block 504 divides the inverted value for the intercept 408 (e.g., "−b") by the slope 406 (e.g., "m") to determine the time of lash exit 506.

Returning to the discussion of FIG. 2, at block 208, the lash angle determination engine 114 compares the zero point identified at block 206 to a datum reference to determine a difference. The datum reference is the point at which the estimated lash angle has reached its threshold to signify the end of lash. This can be determined using a conventional lash exit algorithm. The comparison between the zero point identified at block 206 to the datum reference is done by observing the number time steps the zero point (identified at block 206) occurs before or after the datum reference and creating the identified error in the system then used to adjust the angle estimate.

Figure 6:
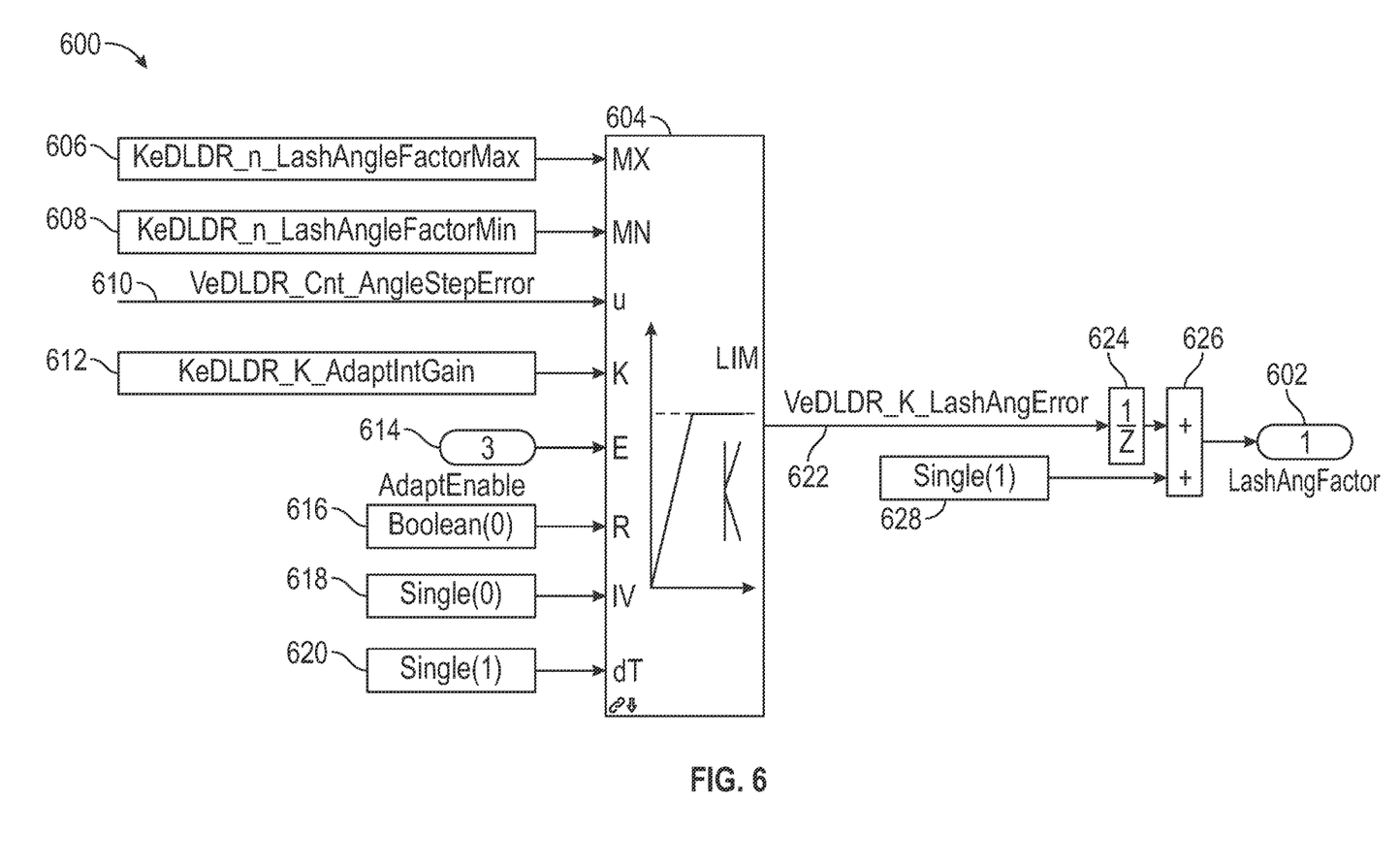
FIG. 6 depicts a block diagram of a system for determining a lash angle factor according to one or more embodiments described herein.

At block 210, the lash angle determination engine 114 integrates the difference to determine a lash angle (e.g., a lash angle factor). FIG. 6 is now described, which depicts a block diagram of a system 600 for determining a lash angle factor 602 according to one or more embodiments described herein. The system 600 uses an integrator 604 to continuously sum the motor acceleration error and create an adaptive factor (e.g., the lash angle factor 602) used to create a feedback loop. The integrator 604 can take as input one or more of the following: a lash angle factor maximum value 606, a lash angle factor minimum value 608, an angle step error value 610, an adaptive integer gain value 612, an enable value 614, a Boolean value 616, and single values 618, 620. The integrator 604 provides for the accumulation of error, where 0=no error. The error is output as a lash angle error 622, and can be inverted at block 624. This provides for breaking the method 200 looping from an integrating lash angle for lash estimated exit. An accumulator 626 adds unity (1) to the lash angle error 622 to convert into a multiplier. For example, the lash angle factor 602 is equal to a lash angle calibration value 628 multiplied by the lash angle error 622.

Returning to the discussion of FIG. 2, at block 212, the lash angle determination engine 114 controls the motor 120 of the vehicle 100 based at least in part on the lash angle. For example, using the lash angle (e.g., the lash angle factor 622), the torque of the motor 120 can be controlled. By controlling torque of the motor 120 based on the lash angle, the motor 120 and the vehicle 100 are both improved. For example, drive/ride quality of the vehicle 100 can be improved over time as lash angle changes, such as due to wear and tear of gears. Similarly, false-triggers caused by motor noise are reduced because regression is used to generate the lash angle.

Additional processes also may be included, and it should be understood that the process depicted in FIG. 2 represents an illustration and that other processes may be added or existing processes may be removed, modified, or rearranged without departing from the scope and spirit of the present disclosure.

Figure 7:
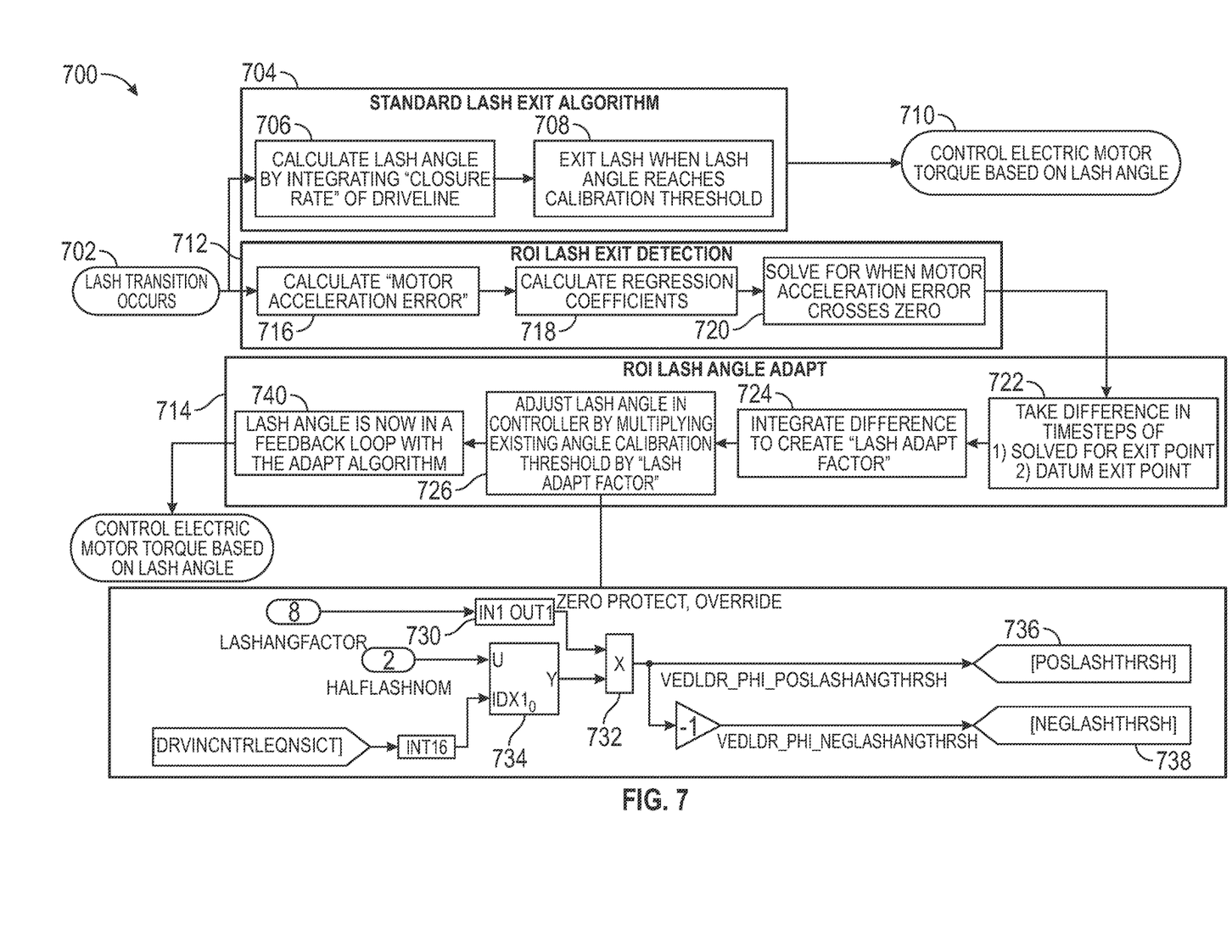
FIG. 7 depicts a flow diagram of a method for lash angle determination according to one or more embodiments described herein.

FIG. 7 depicts a flow diagram of a method 700 for lash angle determination according to one or more embodiments described herein. The method 700 can be performed by any suitable system or device such as the processing system 110 of FIG. 1, the processing system 1000 of FIG. 10, or any other suitable processing system and/or processing device (e.g., a processor).

At block 702, a lash transition occurs. Block 704 shows a standard lash exit algorithm, in which a lash angle is calculated using a closer rate of the driveline (block 706) and exit lash is determined when the lash angle reaches a calibration threshold (block 708). Subsequently, at block 710, the motor 120 is controlled based on the lash angle. This approach is prone to false-triggers due to motor noise in the motor 120 and thus causes inaccurate learning because no regression approach is utilized unlike the one or more embodiments described herein.

Particularly, one or more embodiments described herein utilize the flow path shown in at least blocks 712, 714, which detect the lash exit and adapt the lash angle respectively. Within the block 712, as described herein, the motor acceleration error is calculated at block 716, the regression coefficients are calculated at block 718, and regression fit line is solved for where the motor acceleration error crosses zero at block 720. Within the block 714, a difference in timesteps of 1) the solved for exit point (from block 720) and 2) the datum exit point (the point at which the estimated lash angle has reached its threshold to signify the end of lash) is calculated at block 722. At block 724, the difference from block 722 is integrated to create a lash adapt factor as described herein. At block 726, the lash angle is adjusted by multiplying an existing angle calibration threshold by the lash adapt factor. This is shown in more detail in the block 728, where the lash angle factor is fed into a zero protect override block 730 and multiplied at block 732 by the output of an array indexing block 734 (used to select the lash angle estimate specific to the driveline arrangement being used) to generate a positive lash threshold 736 and a negative lash threshold 738. According to an example, the lash angle input is an array of multiple values, with each value representing the lash angle for a specific driveline arrangement. The array indexing block 734 is used to select the specific lash angle threshold for the driveline equation. At block 740, the lash angle is now in a feedback loop with the method 200 (i.e., an adaptive algorithm) and can be used to control the motor. Particularly, at block 742, the motor 120 is controlled by controlling the torque based on the lash angle from block 714.

Additional processes also may be included, and it should be understood that the process depicted in FIG. 7 represents an illustration and that other processes may be added or existing processes may be removed, modified, or rearranged without departing from the scope and spirit of the present disclosure.

Figure 8:
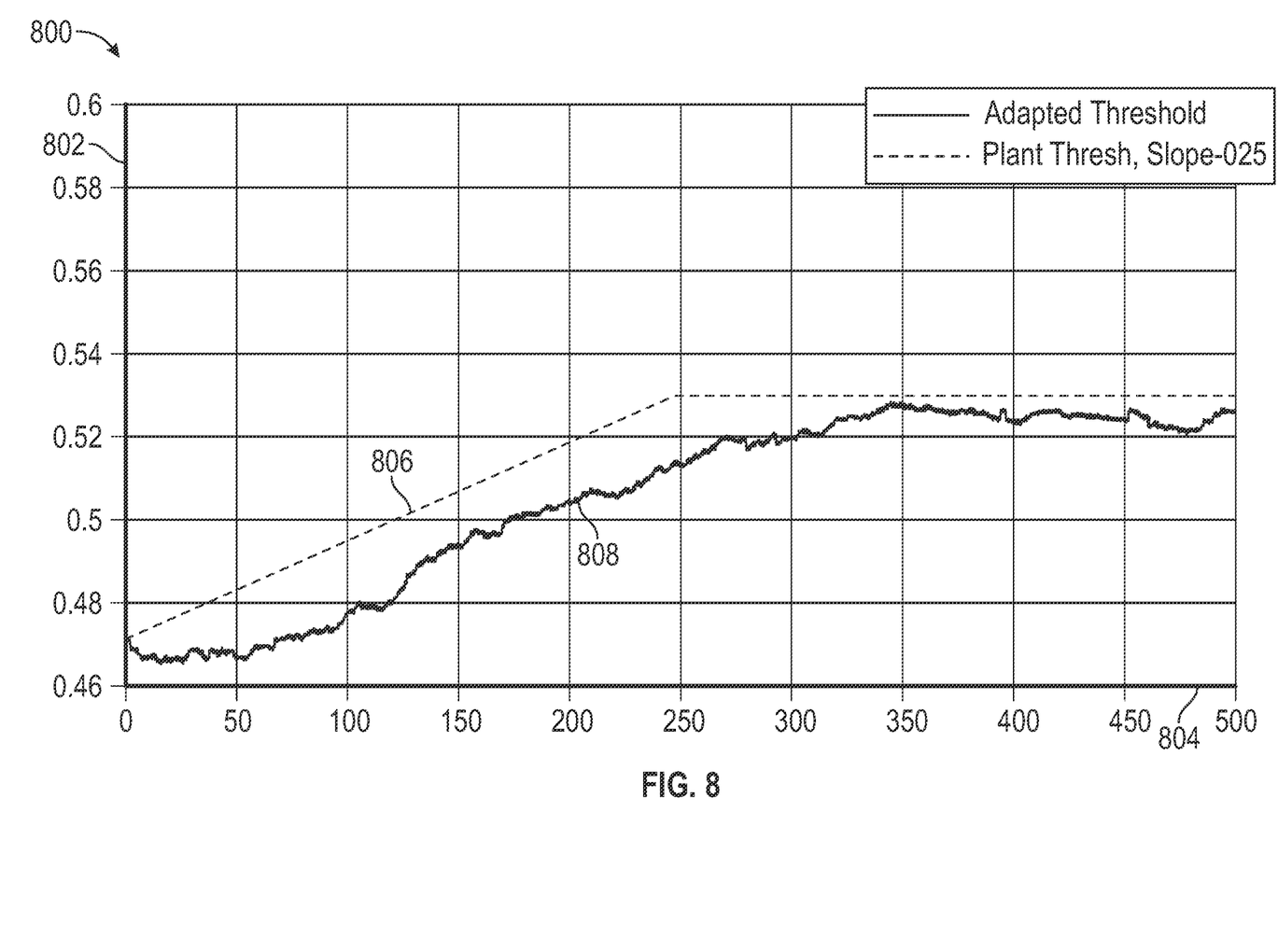
FIG. 8 depicts a graph of lash angle over time according to one or more embodiments described herein.

FIG. 8 depicts a graph 800 of lash angle 802 over time 804 according to one or more embodiments described herein. The line 806 represents a plant threshold with a slope of 0.25, and the line 808 represents the adapted threshold. The graph 800 is generated for a 500 second run, with an increasing-then-constant plant angle (see line 806). The initial lash angle error is 0% in this example, based on a torque input of 10,000 Nm+/−a random value between −2000 and 4000 with a torque rate of 200 Nm/s. In the graph 800, a one time-step delay of detected exit is present, the plant angle increases linearly to 125% of original, and the adapted estimate tracks the plant angle. Particularly, the graph 800 shows how the method 200 learns a plant lash angle that is changing over time. During the first portion (e.g., less than about 250 seconds), the true lash angle is increasing, and the estimate is learning the changes over time, as shown by the line 806. During the second portion (e.g., greater than about 250 seconds), the true lash angle flattens out and the estimate learns that as well, as shown by the line 806.

Figure 9:
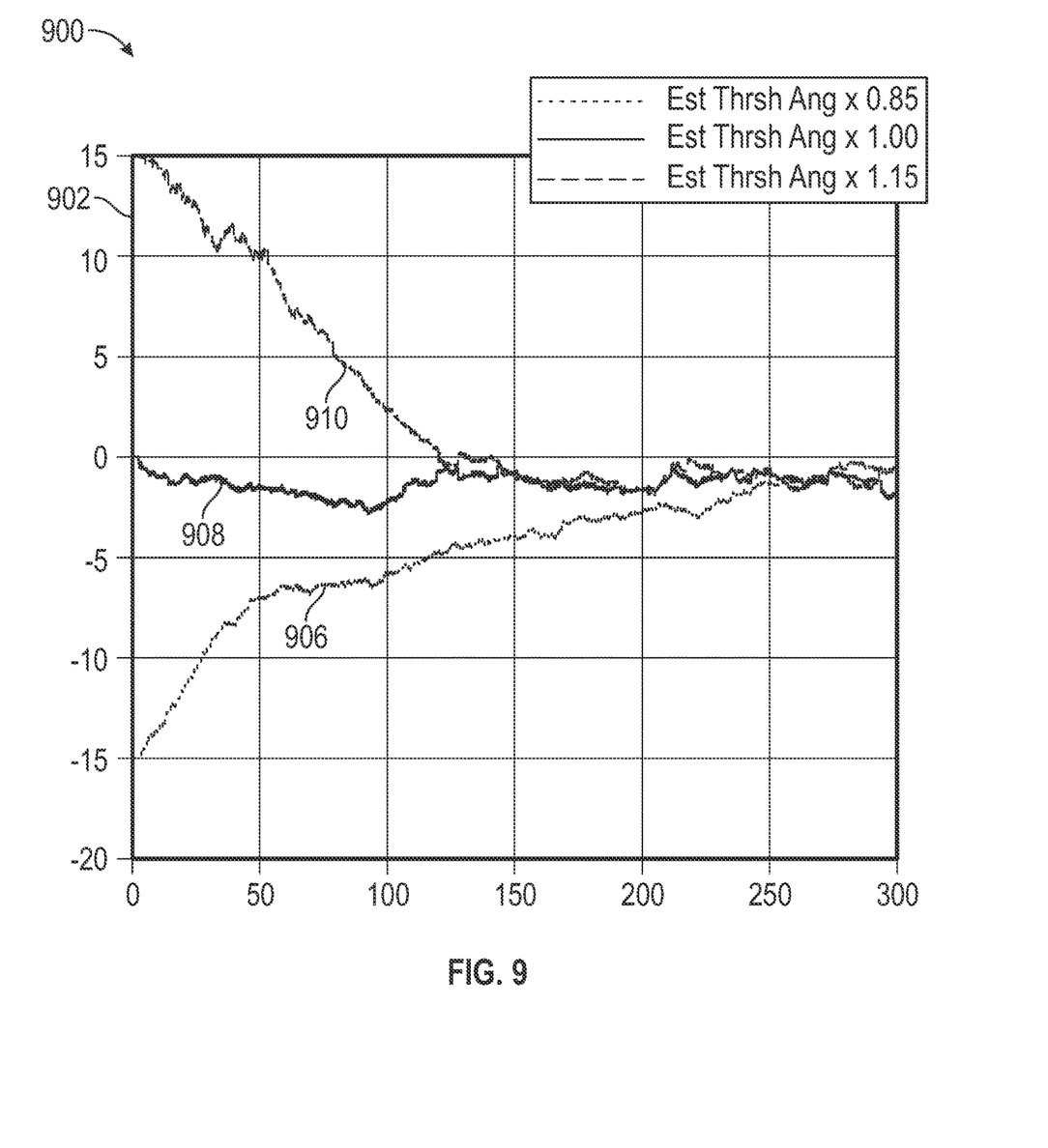
FIG. 9 depicts a graph of lash angle error over time according to one or more embodiments described herein.

FIG. 9 depicts a graph 900 of lash angle error 902 over time 904 according to one or more embodiments described herein. The graph 900 shows three sets of data with different initial last estimate percent errors as line 906 (e.g., an estimated threshold angle of 0.85), line 908 (e.g., an estimated threshold angle of 1.00), and line 910 (e.g., an estimated threshold angle of 1.15). As shown, for each of these cases, the estimate corrects itself over time and is able to learn the true angle, as shown by the convergence of the lines 906, 908, 910.

Figure 10:
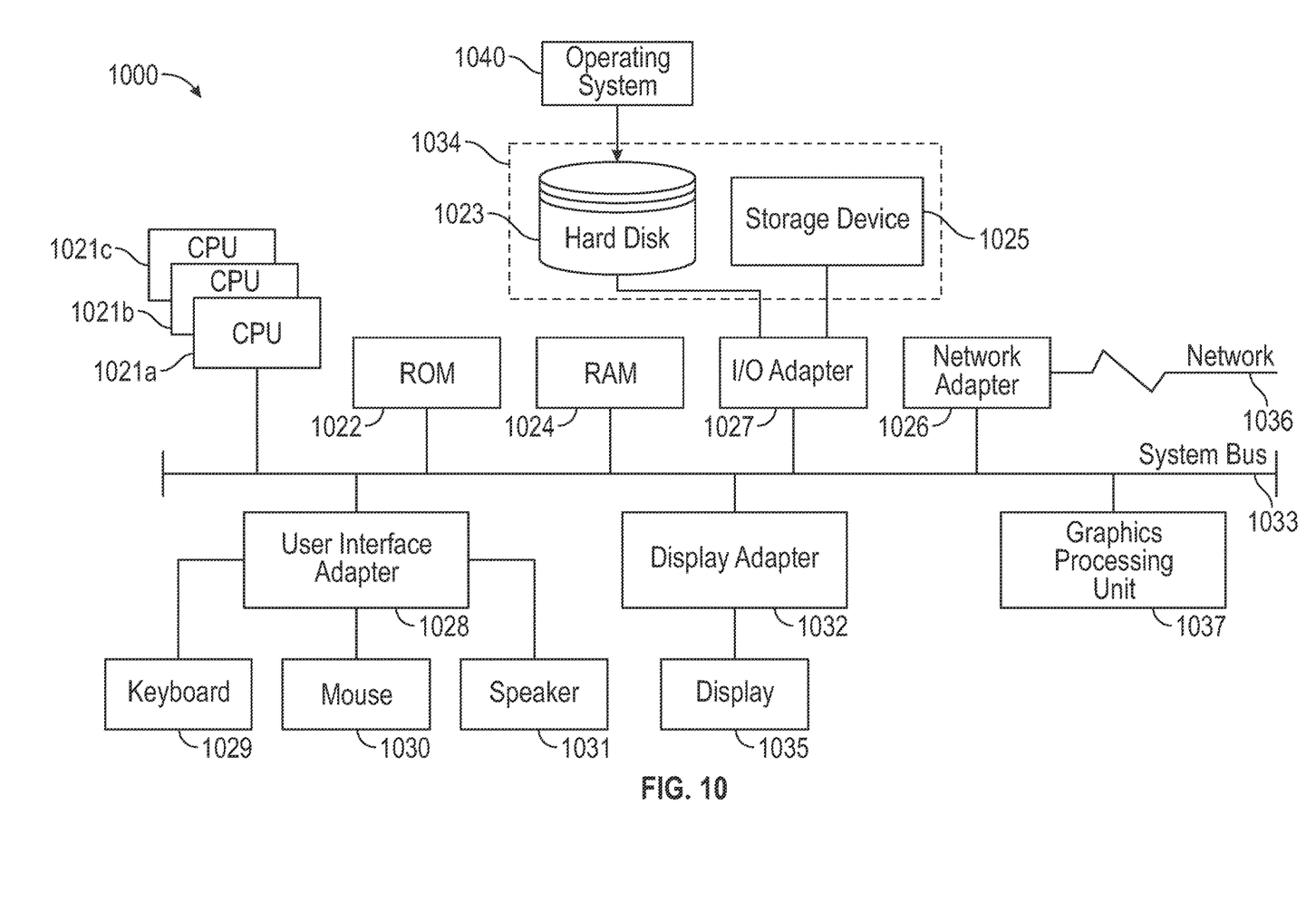
FIG. 10 depicts a block diagram of a processing system for implementing the techniques described herein according to an exemplary embodiment.

It is understood that one or more embodiments described herein is capable of being implemented in conjunction with any other type of computing environment now known or later developed. For example, FIG. 10 depicts a block diagram of a processing system 1000 for implementing the techniques described herein. In examples, processing system 1000 has one or more central processing units ("processors" or "processing resources") 1021*a*, 1021*b*, 1021*c*, etc. (collectively or generically referred to as processor(s) 1021 and/or as processing device(s)). In aspects of the present disclosure, each processor 1021 can include a reduced instruction set computer (RISC) microprocessor. Processors 1021 are coupled to system memory (e.g., random access memory (RAM) 1024) and various other components via a system bus 1033. Read only memory (ROM) 1022 is coupled to system bus 1033 and may include a basic input/output system (BIOS), which controls certain basic functions of processing system 1000.

Further depicted are an input/output (I/O) adapter 1027 and a network adapter 1026 coupled to system bus 1033. I/O adapter 1027 may be a small computer system interface (SCSI) adapter that communicates with a hard disk 1023 and/or a storage device 1025 or any other similar component. I/O adapter 1027, hard disk 1023, and storage device 1025 are collectively referred to herein as mass storage 1034. Operating system 1040 for execution on processing system 1000 may be stored in mass storage 1034. The network adapter 1026 interconnects system bus 1033 with an outside network 1036 enabling processing system 1000 to communicate with other such systems.

A display (e.g., a display monitor) 1035 is connected to system bus 1033 by display adapter 1032, which may include a graphics adapter to improve the performance of graphics intensive applications and a video controller. In one aspect of the present disclosure, adapters 1026, 1027, and/or 1032 may be connected to one or more I/O busses that are connected to system bus 1033 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1033 via user interface adapter 1028 and display adapter 1032. A keyboard 429, mouse 430, and speaker 431 (or other suitable input and/or output, such as a touch screen of an infotainment system) may be interconnected to system bus 433 via user interface adapter 428, which may include, for example, a Super I/O chip integrating multiple device adapters into a single integrated circuit.

In some aspects of the present disclosure, processing system 1000 includes a graphics processing unit 1037. Graphics processing unit 1037 is a specialized electronic circuit designed to manipulate and alter memory to accelerate the creation of images in a frame buffer intended for output to a display. In general, graphics processing unit 1037 is very efficient at manipulating computer graphics and image processing, and has a highly parallel structure that makes it more effective than general-purpose CPUs for algorithms where processing of large blocks of data is done in parallel.

Thus, as configured herein, processing system 1000 includes processing capability in the form of processors 1021, storage capability including system memory (e.g., RAM 1024), and mass storage 1034, input means such as keyboard 1029 and mouse 1030, and output capability including speaker 1031 and display 1035. In some aspects of the present disclosure, a portion of system memory (e.g., RAM 1024) and mass storage 1034 collectively store the operating system 1040 to coordinate the functions of the various components shown in processing system 1000.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for determining a lash angle of a motor, the method comprising:
   calculating, by a processing device, a motor acceleration error based at least in part on a motor torque and a motor speed;
   calculating, by the processing device, a regression fit line based at least in part on the motor acceleration error;
   identifying, by the processing device, a zero point using the regression fit line;
   comparing, by the processing device, the zero point to a datum reference to determine a difference;
   integrating, by the processing device, the difference to determine the lash angle; and
   controlling, by the processing device, the motor based at least in part on the lash angle.

2. The computer-implemented method of claim 1, wherein the motor is disposed in a vehicle.

3. The computer-implemented method of claim 1, wherein calculating the motor acceleration error comprises calculating the motor acceleration error "n" number of times, and wherein calculating the regression fit line comprises vectorizing the motor acceleration error for the "n" number of times.

4. The computer-implemented method of claim 1, wherein the regression fit line is calculated using a linear least squares regression.

5. The computer-implemented method of claim 1, wherein calculating the regression fit line comprises calculating a slope and an intercept.

6. The computer-implemented method of claim 5, wherein identifying the zero point comprises dividing a negated value of the intercept by the slope.

7. The computer-implemented method of claim 1, wherein controlling the motor based at least in part on the lash angle comprises controlling a torque of the motor based at least in part on the lash angle.

8. A system comprising:
   a memory comprising computer readable instructions; and
   a processing device for executing the computer readable instructions, the computer readable instructions controlling the processing device to perform operations for determining a lash angle of a motor, the operations comprising:
      calculating, by the processing device, a motor acceleration error based at least in part on a motor torque and a motor speed;
      calculating, by the processing device, a regression fit line based at least in part on the motor acceleration error;
      identifying, by the processing device, a zero point using the regression fit line;
      comparing, by the processing device, the zero point to a datum reference to determine a difference;
      integrating, by the processing device, the difference to determine the lash angle; and
      controlling, by the processing device, the motor based at least in part on the lash angle.

9. The system of claim 8, wherein the motor is disposed in a vehicle.

10. The system of claim 8, wherein calculating the motor acceleration error comprises calculating the motor acceleration error "n" number of times, and wherein calculating the regression fit line comprises vectorizing the motor acceleration error for the "n" number of times.

11. The system of claim 8, wherein the regression fit line is calculated using a linear least squares regression.

12. The system of claim 8, wherein calculating the regression fit line comprises calculating a slope and an intercept.

13. The system of claim 12, wherein identifying the zero point comprises dividing a negated value of the intercept by the slope.

14. The system of claim 8, wherein controlling the motor based at least in part on the lash angle comprises controlling a torque of the motor based at least in part on the lash angle.

15. A computer program product comprising a computer readable storage medium having program instructions embodied therewith, the program instructions executable by a processing device to cause the processing device to perform operations for determining a lash angle of a motor, the operations comprising:
   calculating, by the processing device, a motor acceleration error based at least in part on a motor torque and a motor speed;
   calculating, by the processing device, a regression fit line based at least in part on the motor acceleration error;
   identifying, by the processing device, a zero point using the regression fit line;
   comparing, by the processing device, the zero point to a datum reference to determine a difference;
   integrating, by the processing device, the difference to determine the lash angle; and
   controlling, by the processing device, the motor based at least in part on the lash angle.

16. The computer program product of claim 15, wherein the motor is disposed in a vehicle.

17. The computer program product of claim 15, wherein calculating the motor acceleration error comprises calculating the motor acceleration error "n" number of times, and wherein calculating the regression fit line comprises vectorizing the motor acceleration error for the "n" number of times.

18. The computer program product of claim 15, wherein the regression fit line is calculated using a linear least squares regression.

19. The computer program product of claim 15, wherein calculating the regression fit line comprises calculating a slope and an intercept, and wherein identifying the zero point comprises dividing a negated value of the intercept by the slope.

20. The computer program product of claim 15, wherein controlling the motor based at least in part on the lash angle comprises controlling a torque of the motor based at least in part on the lash angle.

* * * * *